United States Patent
Hartwell et al.

(10) Patent No.: US 7,200,770 B2
(45) Date of Patent: Apr. 3, 2007

(54) RESTORING ACCESS TO A FAILED DATA STORAGE DEVICE IN A REDUNDANT MEMORY SYSTEM

(75) Inventors: David W. Hartwell, Bolton, MA (US); Maurice B. Steinman, Marlborough, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 464 days.

(21) Appl. No.: 10/750,495

(22) Filed: Dec. 31, 2003

(65) Prior Publication Data

US 2005/0160311 A1  Jul. 21, 2005

(51) Int. Cl.
*G06F 11/00* (2006.01)
(52) U.S. Cl. ............................................. 714/7
(58) Field of Classification Search .................. 714/7, 714/8, 25, 42, 48, 6
See application file for complete search history.

(56) References Cited

U.S. PATENT DOCUMENTS

| | | | | |
|---|---|---|---|---|
| 5,913,927 | A * | 6/1999 | Nagaraj et al. .................. 714/8 |
| 6,842,870 | B2 * | 1/2005 | Austen et al. .................. 714/48 |
| 6,848,063 | B2 * | 1/2005 | Rodeheffer et al. ............. 414/6 |
| 6,950,978 | B2 * | 9/2005 | Arndt et al. .................. 714/800 |
| 2002/0016942 | A1 * | 2/2002 | MacLaren et al. ........... 714/718 |
| 2003/0023932 | A1 * | 1/2003 | Arndt et al. .................. 714/805 |
| 2003/0110248 | A1 * | 6/2003 | Ritche ......................... 709/224 |
| 2004/0088636 | A1 * | 5/2004 | Cypher ......................... 714/764 |

* cited by examiner

*Primary Examiner*—Nadeem Iqbal

(57) ABSTRACT

A computer system comprising a memory system that comprises a plurality of memory modules; and a memory controller that accesses the plurality of memory modules to service memory requests. The computer system also comprises an error-type memory controller that configures the noted access such that the memory controller can continue to access a failed one of the plurality of memory modules that incurred a soft error.

34 Claims, 9 Drawing Sheets

ONE BIT OF A DATA PATH SWITCH 414

RESTORING ACCESS TO A FAILED DATA STORAGE DEVICE IN A REDUNDANT MEMORY SYSTEM

BACKGROUND

1. Field of the Invention

The present invention relates generally to controlling access to computer memory systems and, more particularly, to restoring access to a failed data storage device in a redundant memory system.

2. Related Art

A computer memory module commonly includes a plurality of integrated circuits (ICs), each of which stores millions of binary digits (bits) of data. Most memory ICs store data bits in columns, rows and planes of memory cells, with each cell comprising a relatively small capacitor. When data is written to a memory cell, its capacitor is either charged to a predetermined voltage to represent a "1" bit, or the capacitor is discharged to represent a "0" bit. If the capacitor's charge changes significantly between the time data is written to the memory cell and the time the memory cell is read, data read from the memory cell will not correctly represent the data previously written to that cell. Such an occurrence is commonly referred to as a memory error.

Memory errors can be classified as hard or soft, depending on whether the errors occur repeatably or randomly. For example, a failed capacitor usually causes its memory cell to be read as a "0" regardless of whether a "1" or a "0" was written to the memory cell. Thus, a failed capacitor usually causes repeatable, or hard, memory errors. In contrast, random or soft memory errors are usually caused by sporadic events, most commonly cosmic rays. A sufficiently high-energy cosmic ray passing through a memory cell capacitor can change the capacitor's charge, altering data stored in the memory cell. Because of their relatively narrow beams, cosmic rays typically affect only one or a small number of memory cells of a memory module.

Progressively smaller capacitors have been used in successive generations of memory ICs, yielding higher densities of memory cells and, therefore, higher memory capacities. Unfortunately, such higher-density memory modules are more susceptible to cosmic ray-induced memory errors than their lower-density counterparts. Smaller capacitors require lower voltages to represent a "1" bit, enabling weaker cosmic rays to alter the contents of the memory cells. In addition, because such memory cells are more densely packed in the ICs, a single cosmic ray can pass through, and therefore affect, a greater number of capacitors than in lower-density memory ICs. Thus, higher-density memory ICs are more likely to incur soft memory errors and are more likely to incur multi-bit, as opposed to single-bit, soft errors than lower-density memory ICs.

Various protocols have been developed to manage memory errors. For example, some memory systems include capabilities similar to those used in redundant arrays of independent disk (RAID) storage systems. In the context of memory systems, the term "RAID" traditionally refers to redundant arrays of industry-standard DIMMs (dual in-line memory modules), although the term "RAIM" (redundant array of independent memory) is also commonly used to refer to such systems, and will be used herein. If one of the redundant storage devices (disk drives or memory modules) fails, the redundancy enables the memory system to use data from the surviving storage devices to reconstruct data stored on the failed device. This process of reconstructing lost data is commonly referred to as error correction.

A RAIM memory system uses a quantity of memory modules (typically four) to store data, and an additional (e.g., a fifth) memory module to store parity information. Data to be stored is divided into four blocks. Each block is stored in one of the data memory modules in a process commonly known as striping. Parity information calculated from the four blocks is stored in the parity memory module. When retrieving data from the memory modules, the ECC logic typically included in the RAIM system attempts to automatically correct detected data errors. If the error cannot be corrected (i.e., it is "uncorrectable"), the data fetched from the failed memory module is reconstructed using the data in the remaining three data memory modules and the parity information in the parity memory module. In addition, the RAIM memory system ceases reading (i.e., takes off-line) the memory module that incurred the uncorrectable error.

After a failed memory module is taken off-line, the remaining memory modules do not thereafter provide the redundancy necessary to be able to recover from an uncorrectable error. That is, if one of the three remaining memory modules, or the parity memory module, subsequently incurs an uncorrectable error, the RAIM memory system will be unable to reconstruct the data. Instead, it will signal an unrecoverable memory error, typically causing the host computer system to crash.

SUMMARY OF THE INVENTION

In one aspect of the present invention, a method of configuring access to a failed memory module is disclosed. The method comprises determining a type of the error; and configuring access to the memory module based on the error type.

In another aspect of the present invention, a computer system is disclosed. The computer system comprises a memory system that comprises a plurality of memory modules; and a memory controller that accesses the plurality of memory modules to service memory requests. The computer system also comprises an error-type memory controller that configures the noted access such that the memory controller can continue to access a failed one of the plurality of memory modules that incurred a soft error.

In a further aspect of the present invention, a memory system for restoring access to a memory module that incurred an error is disclosed. The memory system comprises means for determining a type of the error; and means for restoring access to the memory module if said type of error is determined to be a soft error.

DETAILED DESCRIPTION

Embodiments of the present invention are directed toward providing continued access to a memory module that has incurred an uncorrectable soft error. The inventors have recognized that after a redundant memory system detects an uncorrectable memory error, the memory module that incurred the error (the "failed" memory module) can continue to be accessed with no loss of reliability when the uncorrectable error is soft. Accordingly, embodiments of the present invention configure access to a failed memory module based on the type of uncorrectable memory error; that is, whether the memory error is soft or hard.

To determine the type of error, embodiments of the present invention preferably continue to write data to the failed memory module as though no error occurred, and the failed memory module is monitored (i.e., put on "probation"). While a memory module is on probation, the memory system reconstructs data from the remaining memory modules rather than reading potentially unreliable data from the failed memory module. If, upon analysis, certain embodiments of the present invention determines that the uncorrectable error was hard, the failed memory module is no longer used (i.e., it is "condemned" and taken off-line). On the other hand, if the uncorrectable error was soft, the memory module is brought back on-line (i.e., "exonerated") for reading, thereby restoring full data redundancy in the memory system. In those embodiments in which data is continually written to a failed memory module during probation, exonerated memory modules will contain current data when brought back on-line.

As noted, as memory densities have increased, there has been a concomitant increase in the likelihood of soft errors. Detection of an uncorrectable memory error, regardless of type, results in the memory module being taken off-line in conventional redundant memory systems. Because soft errors occur frequently, particularly in high-capacity memory devices, conventional redundant memory systems frequently take memory modules off-line and are unable to recover from subsequent uncorrectable errors in the remaining memory modules. In contrast, embodiments of the present invention continue to use memory modules that have experienced uncorrectable soft errors. Because most memory errors are soft, such embodiments of the present invention significantly reduce the likelihood that an unrecoverable error will occur.

Embodiments of the present invention can be implemented in connection with any type of redundant memory system. Embodiments will be described below in the context of one class of redundant memory system, known as a redundant array of independent memory (RAIM) memory system. It should be appreciated, however, that embodiments of the present invention can be implemented in connection with all applicable redundant memory systems unless otherwise noted.

Figure 1:
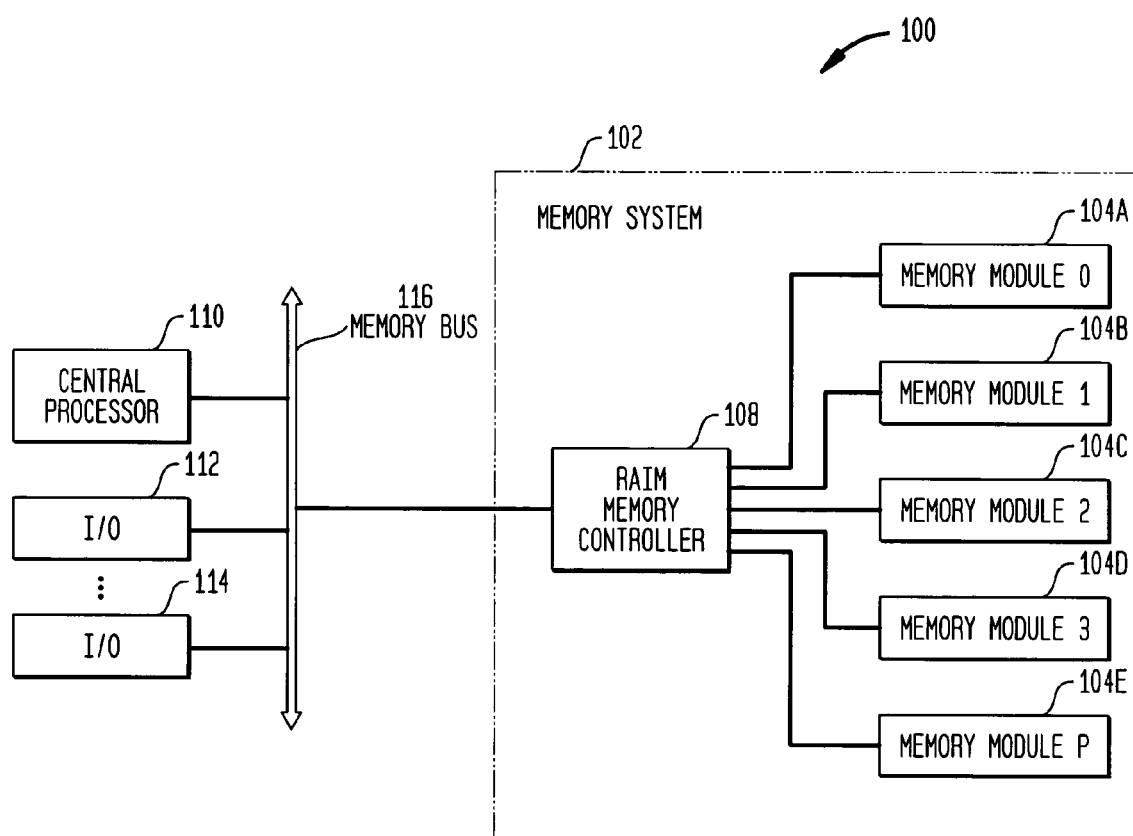
FIG. 1 is a block diagram of an exemplary computer in which embodiments of the present invention can be practiced.

FIG. 1 is a block diagram of an exemplary computer 100 implementing a RAIM memory system 102. Memory system 102 comprises a plurality of memory modules 104A–E connected to and controlled by a RAIM memory controller 108. Computer 100 further comprises a central processor 110, I/O devices 112 and 114 and other devices and components (not shown), all directly or indirectly interconnected by a memory bus 116.

Data is stored in memory modules 0–3 (104A–D) while parity information is stored in memory module P (104E). Memory modules 104 are preferably Rambus® memory modules, or RIMMs® (RAMBUS and RIMM are registered trademarks of Rambus, Inc.) It should be appreciated, however, that dual in-line memory modules (DIMMs) as well as other types of memory modules can also be used. Memory modules 104 provide redundant storage for data stored by RAIM memory controller 108. Although five memory modules are shown in FIG. 1, embodiments of the present invention can be implemented in connection with redundant memory systems having any quantity of memory modules.

Figure 2:
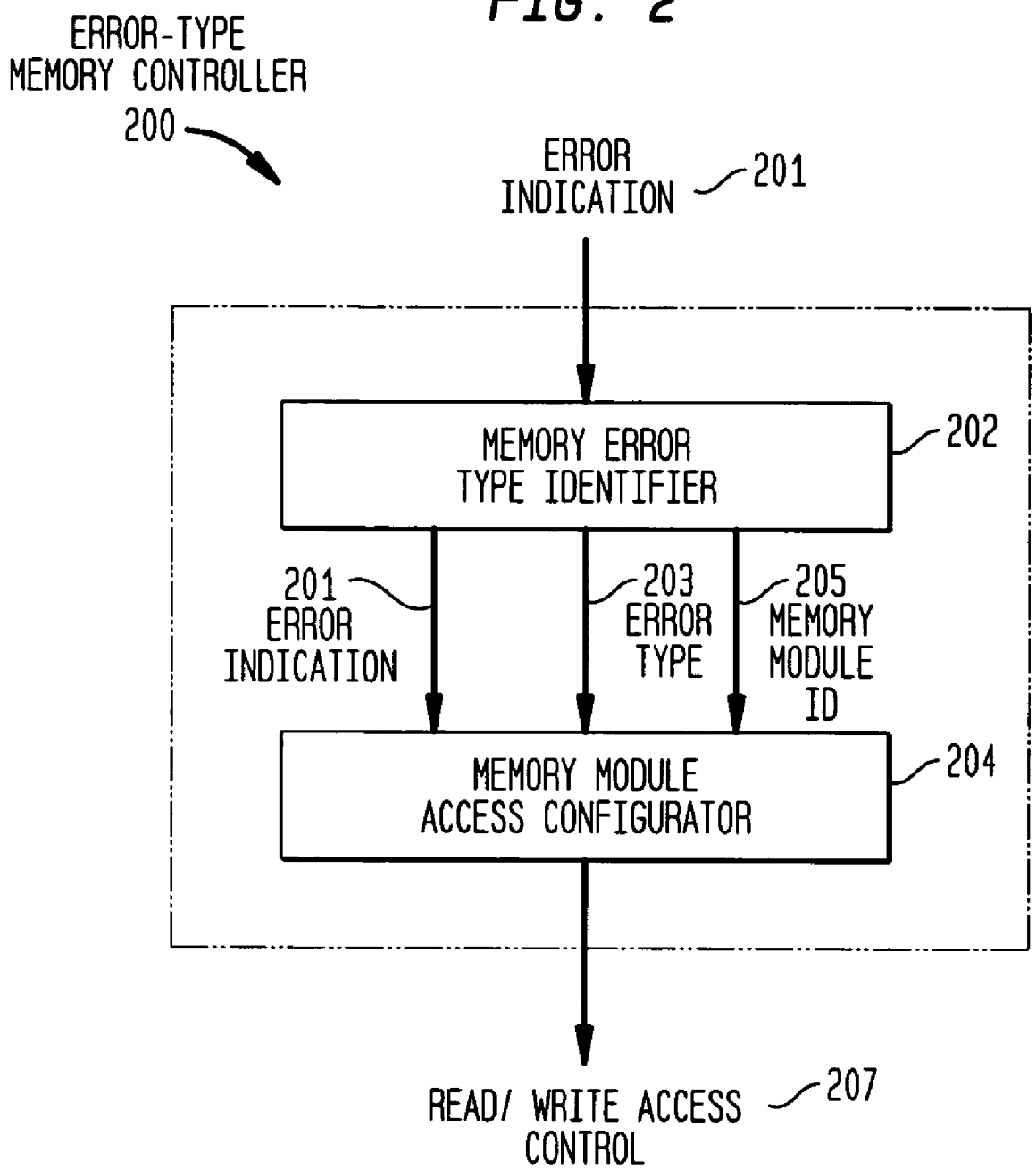
FIG. 2 is a simplified block diagram illustrating functional components of a memory control apparatus, such as one that can be employed in the computer of FIG. 1, according to one embodiment of the present invention.

FIG. 2 is a simplified block diagram illustrating functional components of an error-type memory controller 200, according to one embodiment of the present invention. Error-type memory controller 200 is preferably implemented as a combination of hardware and software components, as described in detail below. The hardware components can, for example, be included in RAIM memory controller 108, and the software components can, for example, be executed by central processor 110. Alternatively, memory controller 200 can be implemented solely in hardware or solely in software.

Error-type memory controller 200 comprises a memory error type identifier 202 that determines whether an uncorrectable error incurred by a memory module 104 is hard or soft. As noted, hard memory errors are errors that repeatably occur while soft memory errors are errors that randomly occur. In the exemplary embodiment illustrated in FIG. 2, identifier 202 receives an indication 201 that an uncorrectable error has occurred in a memory module 104. It should be appreciated that such information can be received, calculated, derived, etc., by another component of memory system 102, or by memory error type identifier 202 based on information provided by other component(s) of memory system 102.

Error-type memory controller 200 also comprises a memory module access configurator 204 that configures read and write access to memory modules 104 based on the type of uncorrectable error that has been incurred. Memory access configurator 204 receives from identifier 202 indications 203, 205 identifying the type of uncorrectable error that has been incurred, and the particular memory module 104 in which it occurred. In addition, memory access configurator 204 also receives error indication 201. It should be appreciated that such information need not be strictly received as depicted, but can be derived from other information provided by identifier 202, or received or derived from information provided by other component(s) of memory system 102.

When an uncorrectable error is detected, memory module access configurator 204 prevents read access to the failed memory module, thereby placing the memory module on probation until memory error type identifier 202 determines the type of error that has occurred. As will be described in detail below, memory access configurator 204 preferably permits continued write access to the failed memory module 104 during probation. If the error is determined to be a hard error, memory module access configurator 204 continues to prevent read access to the memory module 104. However, if the uncorrectable error is determined to be a soft error, memory module access configurator 204 re-enables read access to the failed memory module 104. Memory access configuration 204 controls read and write access to memory modules 104 through the generation of one or more read and write access control signals 207. The quantity, format and content of signals 207 are appropriate for controlling selected components of memory system 102.

Figure 3:
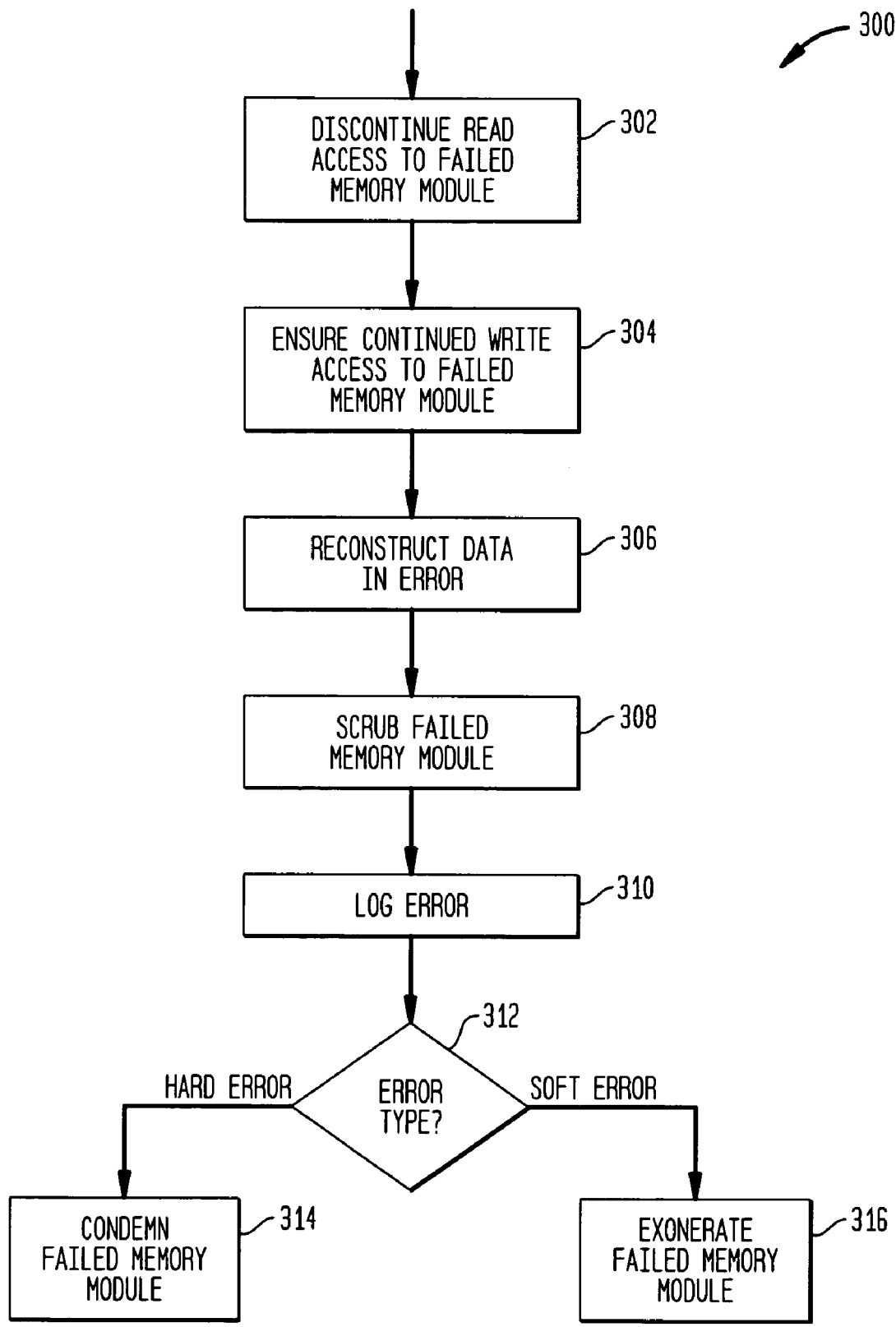
FIG. 3 is a high-level flowchart of operations performed by one embodiment of the memory control apparatus of the present invention.

FIG. 3 is a high-level flowchart of operations performed by certain embodiments of the present invention. Process 300 is invoked in response to the occurrence of an uncorrectable error in a memory module 104. As noted, an uncorrectable memory error is one which could not be corrected by the implemented ECC logic. At 302, read access to the memory module 104 that incurred the uncorrectable error is discontinued, thereby placing the memory module on probation. Later, depending on whether the uncorrectable error is determined to be soft or hard, read access to the failed memory module 104 might be resumed.

At 304, write access to the failed memory module 104 is continued to ensure the memory module contains current data if and when it is exonerated. In certain applications, memory controller 108 automatically discontinue write access to a memory module 104 that has incurred an uncorrectable error. When implemented in such systems, embodiments of the present invention preferably inhibit or reverse such operations to ensure continued write access to the failed memory module 104.

At 306, the uncorrectable data in error is reconstructed using whatever technique is implemented in the redundant memory system. In the exemplary RAIM memory system 102, for example, the requested data is reconstructed using the data from the remaining three memory modules 104 and the parity information stored in memory module 104E. It should be appreciated, however, that other data reconstruction techniques can be implemented. The reconstructed data is supplied to central processor 110, I/O device 112 or 114 or other component which requested the data. In addition, at 308, reconstructed data is stored in the failed memory module 104; that is, the data is scrubbed so that a next uncorrectable error, if any, that is detected in the same memory module 104 can be interpreted as a second uncorrectable error rather than a legacy of the first uncorrectable error. Scrubbing the failed memory module 104 will also ensure that the failed memory module will contain valid data if and when it is exonerated.

The error is logged at 310. This current and possibly prior error(s) incurred by the memory module 104 are analyzed at 312 to determine whether this error was soft or hard. Such a determination can be based on any number of considerations, examples of which are provided below. Access to the failed memory module 104 is then configured based on the error type. For example, failed memory modules 104 that have incurred a soft error are exonerated, as depicted at 316. Here, read access is re-enabled. Because write access was not disabled at 304, the failed memory module 104 is thereafter fully functional and system redundancy is restored.

On the other hand, at 314, a failed memory module 104 that has incurred a hard error is condemned. The above embodiments of the present invention continue to prevent read access but permits continued write access. In an alternative embodiment, write access is also disabled. Such an alternative embodiment may be implemented, for example, in memory systems that support 'hot swap' or 'active replacement' of memory modules 104 during system operations.

As noted, embodiments of the present invention are preferably implemented as a combination of hardware and software components. A description of one such embodiment is now provided, beginning with a description of its hardware components, followed by a description of its software components and an explanation of how these components interact. In the exemplary embodiment described below, memory error type identifier 202 is implemented in software executing on central processor 110 (FIG. 1) and memory module access configurator 204 is implemented as hardware in RAIM memory controller 108 (FIG. 1). It should be understood that such an allocation of functionality is exemplary only; the present invention can be implemented in any combination of hardware and software, as noted above.

Figure 4:
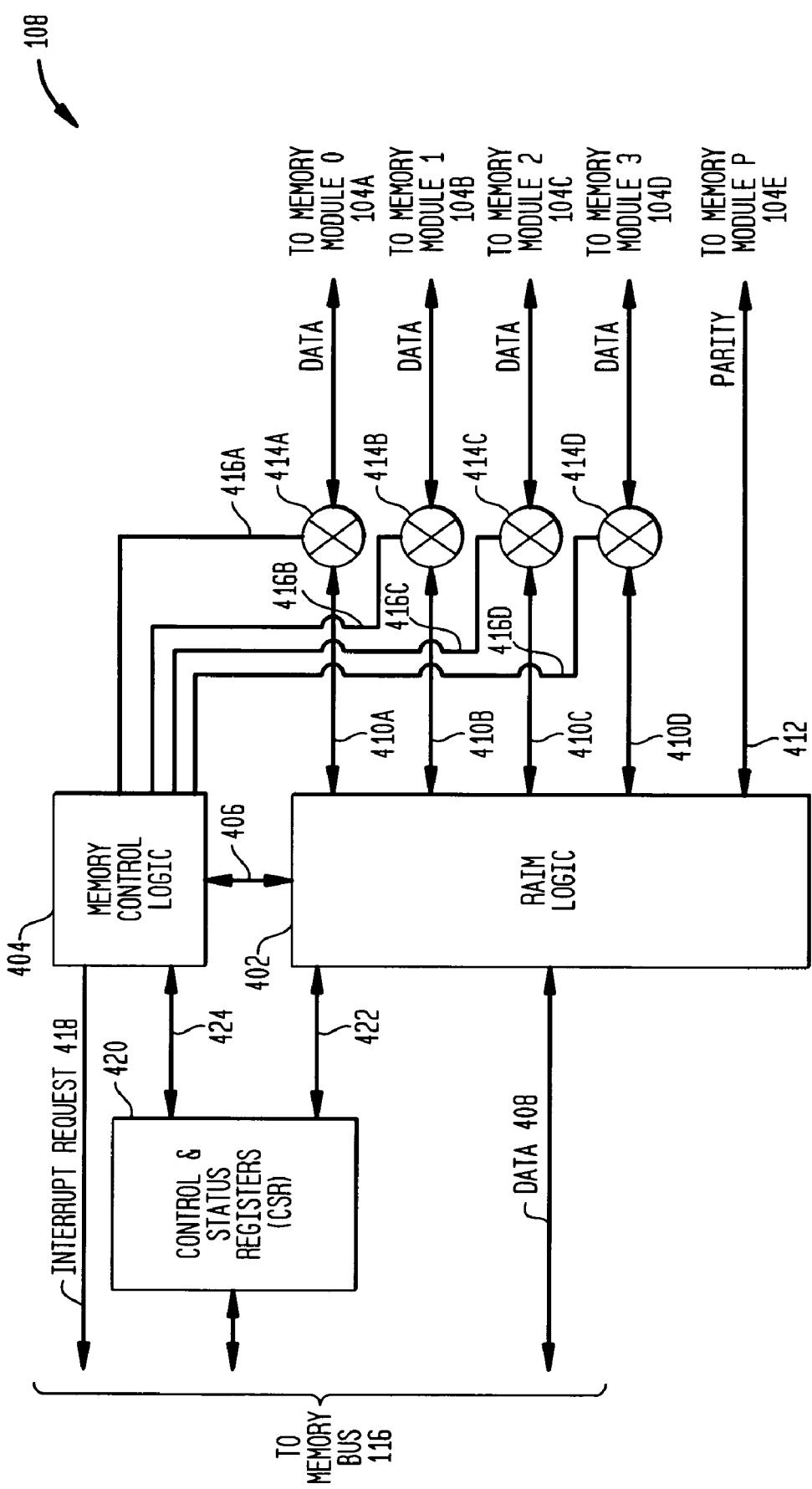
FIG. 4 is a simplified block diagram of the memory controller shown in FIG. 1, according to one embodiment of the present invention.

FIG. 4 is a simplified block diagram of memory controller 108, in accordance with one embodiment of the present invention. In this embodiment, memory controller 108 is a RAIM memory controller. Memory control logic 404 implements memory module access configurator 204, as described below. RAIM memory controller 108 comprises RAIM logic 402 coupled to, and controlled by, memory control logic 404 via connection 406. In this exemplary embodiment, memory control logic 404 implements memory module access configurator 204 as described below.

RAIM logic 402 is also coupled to memory bus 116 via a data path 408. In addition, RAIM logic 402 is coupled to memory modules 104A–E by data lines 410A–D and 412, respectively. Separately-controllable, in-line switches 414A–D are located in corresponding data lines 410A–D. Switches 414 are controlled by memory control logic 404 via control lines 416A–D, respectively, to configure read and write access to memory modules 104. Switches 414 are described in detail below with reference to FIG. 5.

As noted with respect to FIG. 1, RAIM memory controller 108 communicates with central processor 110 and other components of computer 100 via memory bus 116. In the embodiment illustrated in FIG. 4, RAIM memory controller 108 communicates with external components via an interrupt request line 418 and a set of registers collectively referred to as control and status registers (CSR) 420. In this embodiment, RAIM logic 402 and memory control logic 404 read and write from/to CSR 420 via connections 422 and 424, respectively. Thus, via CSR 420, external components, such as the software implementation of memory error type identifier 202 being executed by central processor 110, can obtain status information from, and control operations of, memory control logic 404 and RAIM logic 402.

RAIM logic 402 distributes data to be stored by memory system 102 (FIG. 1) across memory modules 104A–D in a process commonly known as striping. RAIM logic 402 receives data to be stored in memory system 102 over data path 408. In this illustrative embodiment, RAIM logic 402 divides the received data into four blocks and calculates parity information from the four blocks. RAIM logic 402 then sends the four data blocks and parity information to memory modules 104 via data paths 410A–D and 412, respectively. Conversely, when data is fetched from memory system 102, RAIM logic 402 reads four data blocks and parity information from memory modules 104 over data paths 410 and 412. In addition to managing the storage of data in memory modules 104, RAIM logic 402 includes ECC logic that detects and possibly corrects certain data errors. RAIM logic 402 sends the (possibly corrected) data to memory bus 116 via data path 408.

In the embodiment illustrated in FIG. 4, RAIM logic 402 comprises primarily conventional components that perform the above-noted functions. In accordance with aspects of the present invention, once an uncorrectable memory error is detected, RAIM logic 402 notifies memory control logic 404 of the error via connection 406. In response, memory control logic 404 (re)configures access to the failed memory module 104 by controlling certain operations of RAIM logic 402 via connection 406, and by controlling switches 414A–D via their corresponding control lines 416A–D. Once the type of the error is determined, the software embodiment of memory error identifier 202 executing on central processor 110 commands memory control logic 404 and RAIM logic 402 via CSR 420 to further (re)configure access to the failed memory module 104. Memory control logic 404 is described in detail below.

As noted, access to memory modules 104A–D is partly or wholly controlled by the states of switches 414A–D, respectively. Each switch 414A–D controls the transfer of data over a corresponding data bus 410A–D to control read and write access by RAIM logic 402 to a corresponding memory module 104A–D. Each data path 410 is preferably a multibit bus, and each switch 414 preferably controls all the data bits of its corresponding bus 410. Each switch 414 controls whether data from RAIM logic 402 can be sent (written) to the switch's corresponding memory module 104 for storage therein. Independent of its write setting, each switch 414A–D controls whether data can be fetched (read) by RAIM logic 402 from the corresponding memory module 104A–D.

Figure 5:
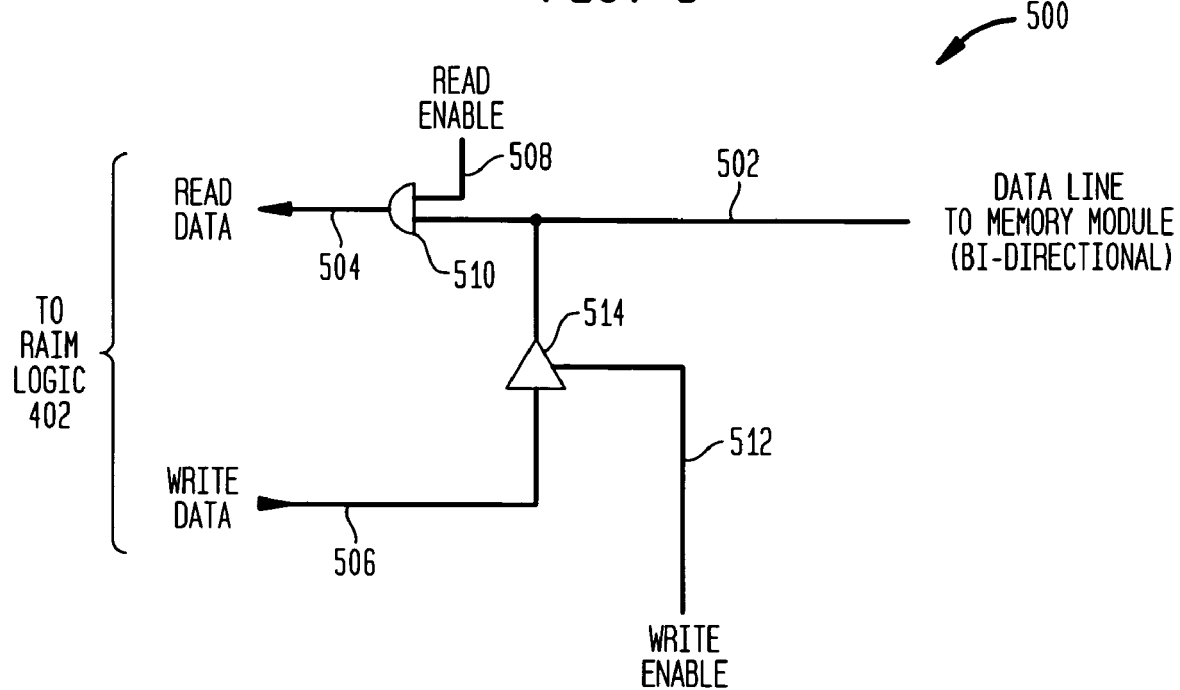
FIG. 5 is a simplified schematic diagram of a one-bit slice of one of the switches shown in FIG. 4, according to one embodiment of the present invention.

FIG. 5 is a simplified schematic diagram of an exemplary one-bit slice 500 of one of the data path switches 414 introduced above with reference to FIG. 4. One-bit bi-directional line 502 connects bit slice 500 to its corresponding memory module 104. One-bit read data line 504 and one-bit write data line 506 connect bit slice 500 to RAIM logic 402. Read enable line 508 is part of one of the control lines 416, by which memory control logic 404 controls bit slice 500. When read enable line 508 is true, data from the corresponding memory module 104 arriving on line 502 is passed by AND gate 510, via read data line 504, to RAIM logic 402. Thus, when read enable line 508 is true, RAIM logic 402 can read the corresponding data bit from the corresponding memory module 104, and when read enable line 508 is false, RAIM logic 402 cannot read data from the corresponding memory module 104.

Write enable line 512 is also part of the control line 416 that carries signals from memory control logic 404 to the switch 414 that includes data slice 500. When write enable line 512 is true, data from RAIM logic 402 arriving on write data line 506 is placed by tri-state driver 514 on bi-directional line 502 and, thereby, sent to the corresponding memory module 104. Thus, when write enable line 512 is true, RAIM logic 402 can write data to the corresponding memory module 104, and when write enable line 512 is false, RAIM logic 402 cannot write data to the memory module.

Figure 6:
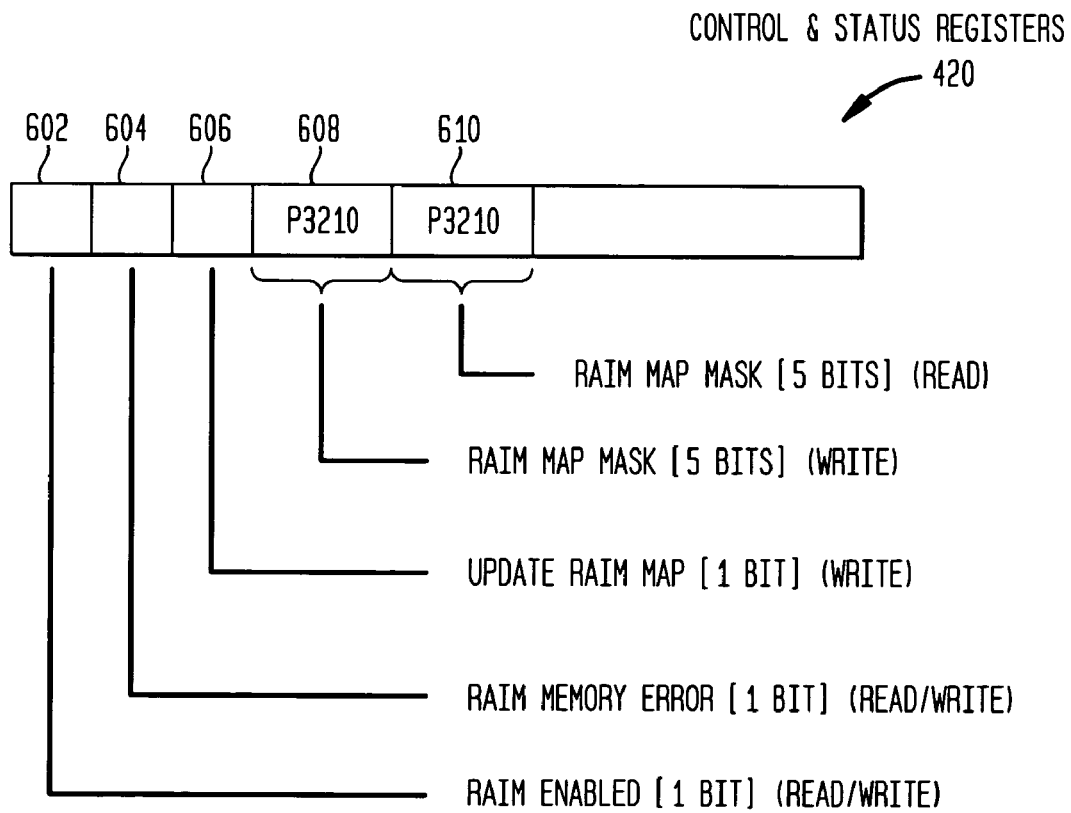
FIG. 6 is a simplified diagram of control and status registers (CSR) shown in FIG. 4, according to one embodiment of the present invention.

As noted, in the embodiment illustrated in FIG. 4, control and status registers (CSRs) 420 are utilized to facilitate communications between external devices, such as central processor 110, and memory control logic 404 and RAIM logic 402. FIG. 6 is a simplified diagram of one embodiment of CSRs 420. CSRs 420 comprise several flags and fields.

Specifically, CSR 420 includes a RAIM enabled flag 602, a RAIM memory error flag 604, an update RAIM map flag 606, a RAIM write map mask field 608 and a RAIM read map mask field 610.

RAIM enabled field 602 is a one-bit, read/write flag that controls and indicates the RAIM capability of RAIM logic 402. For example, central processor 110 (FIG. 1) can set RAIM enabled flag 602 to a "1" to turn on the RAIM capability, or central processor 110 can clear this flag to a "0" to turn off the RAIM capability. In addition, central processor 110 can read RAIM enabled flag 602 to ascertain if the RAIM capability is currently enabled.

RAIM memory error flag 604 is a one-bit field that indicates whether RAIM logic 402 (FIG. 4) has detected an error in data from one or more memory modules 104. When such an error is detected, read/write RAIM memory error flag 604 is set to "1," and memory control logic 404 generates an interrupt request to central processor 110 via interrupt request line 418. In addition, a value is placed in read/write RAIM read map mask 610 to indicate which memory module 104 incurred the error.

RAIM read map mask field 610 is, in this embodiment, a 5-bit field, with each bit corresponding to one memory module 104A–E. RAIM logic 402 sets individual bits in RAIM read map mask fields 610 to indicate which memory module 104 has experienced a memory error. For example, if an error is detected in data from memory module 104B (memory module number 1), RAIM read map mask 610 is set to 00010 (binary), with the "0" bits indicating that memory modules 104A and 104C–E have not experienced an error, and the "1" bit indicating the error that occurred in memory module 104B.

In conjunction with write-only update RAIM map flag 606, RAIM map mask fields 608 and 610 can be used to selectively enable or disable any combination of memory modules 104 for writing and/or reading. If update RAIM map flag 606 is set to "1," memory control logic 404 (FIG. 4) reads RAIM map masks 608 and 610 and enables or disables memory modules 104 for reading, according to the values of RAIM map masks 608 and 610. For example, to enable all memory modules 104 for writing and reading, except memory module 104B (memory module number 1) for reading, central processor 110 can set RAIM read map mask 610 to 11101 (binary) and set update RAIM map flag 606 to "1." The "0" bit in 11101 (binary) disables memory module 104B for reading, while the "1" bits enable the other memory modules 104A, C, D and E for reading. In response, memory control logic 404 controls switches 414 to enable and disable (as appropriate) individual memory modules 104 for reading. Bits in RAIM write map mask 608 similarly enable and disable write access to memory modules 104, as noted above.

As one of ordinary skill in the art would appreciate, to prevent memory system 102 from returning inconsistent data, changes to settings of switches 414 to (re)enable read access to memory modules 104 preferably occur only during a dynamic random-access memory (DRAM) refresh cycle or other time when no read or write access to memory modules 104 can occur. If read access to a memory module 104 were to be enabled, for example, while RAIM logic 402 is reading remaining memory modules 104 to reconstruct data for a failed memory module, inconsistent data could be retrieved by RAIM logic 402, causing an error in the reconstructed data. Because access to memory modules 104 is prohibited during a refresh cycle, memory control logic 404 delays the settings of switches 414 until the next refresh cycle.

Figure 7:
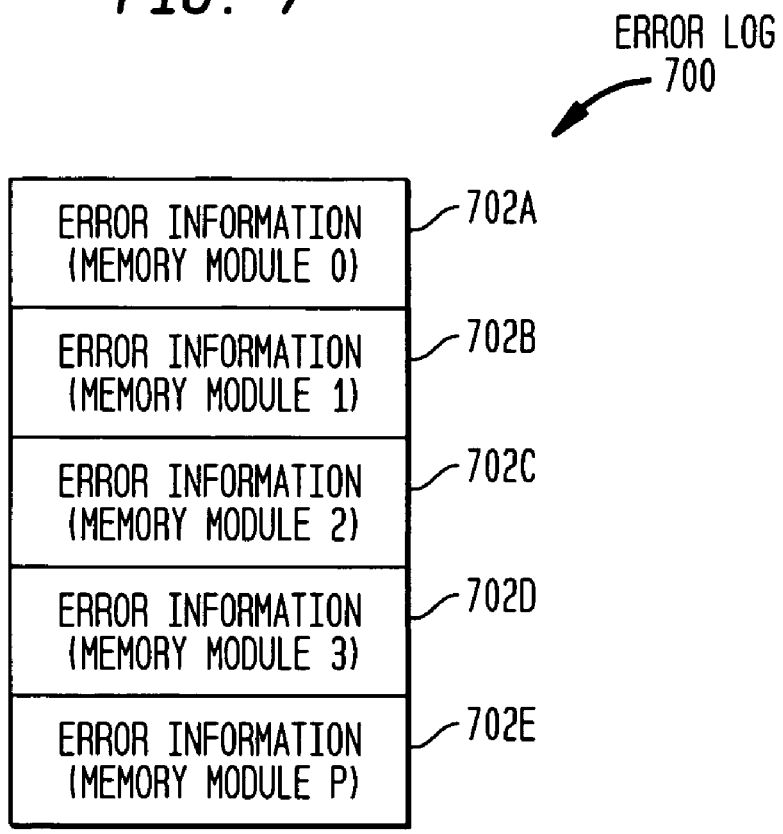
FIG. 7 is a data structure diagram of an error log, according to one embodiment of the present invention.
Figure 8:
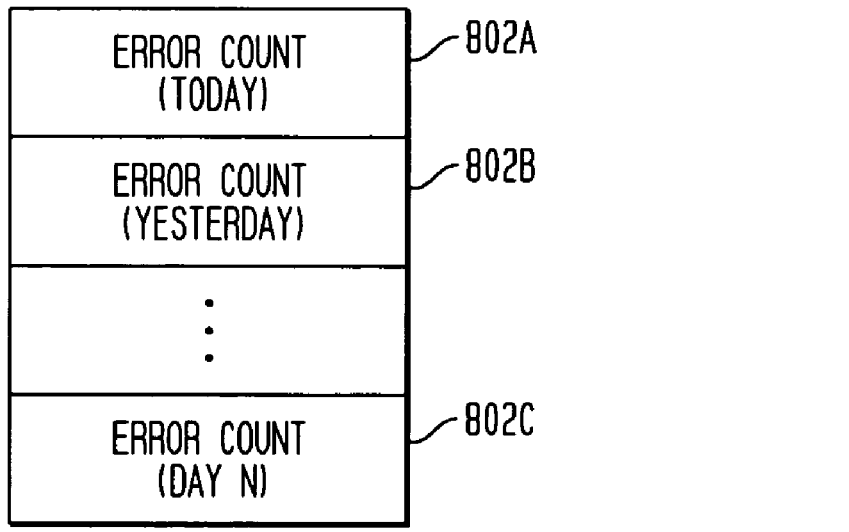
FIG. 8 is a data structure diagram of error information stored in the error log shown in FIG. 7, according to one embodiment of the present invention.

As noted, embodiments of the present invention configure read and write access to memory modules 104 based on the types of errors (soft or hard) incurred by the memory modules. To determine the type of memory error, embodiments of the present invention preferably analyze an error log of, for example, historic error information. FIG. 7 is a data structure diagram of one exemplary embodiment of an error log 700. Error log 700 contains error information 702A–E corresponding to memory modules 104A–E, respectively. FIG. 8 is a data structure diagram of an exemplary embodiment of the error information 702 stored in error log 700. In this exemplary embodiment, error information 702 comprises the quantity of errors that occurred during one or more predetermined time periods. In the embodiment shown in FIG. 8, for example, error information 702 comprises error counts 802A–C for each of several days. Other embodiments of error log 700 and error information 702 are, of course, possible, as would be appreciated by those of ordinary skill in the art. For example, in one alternative embodiment, error counts 802 are accumulated for other time periods, such as per hour. In further embodiments, more complex error log information is maintained and/or calculated. In alternative embodiments, for example, a moving average number of errors or error rate can be maintained or calculated for each memory module 104. It should be further appreciated that in all the above and other embodiments, this error information can be more finely resolved. For example, error information can be maintained for each page of each memory module 104.

Figure 9:
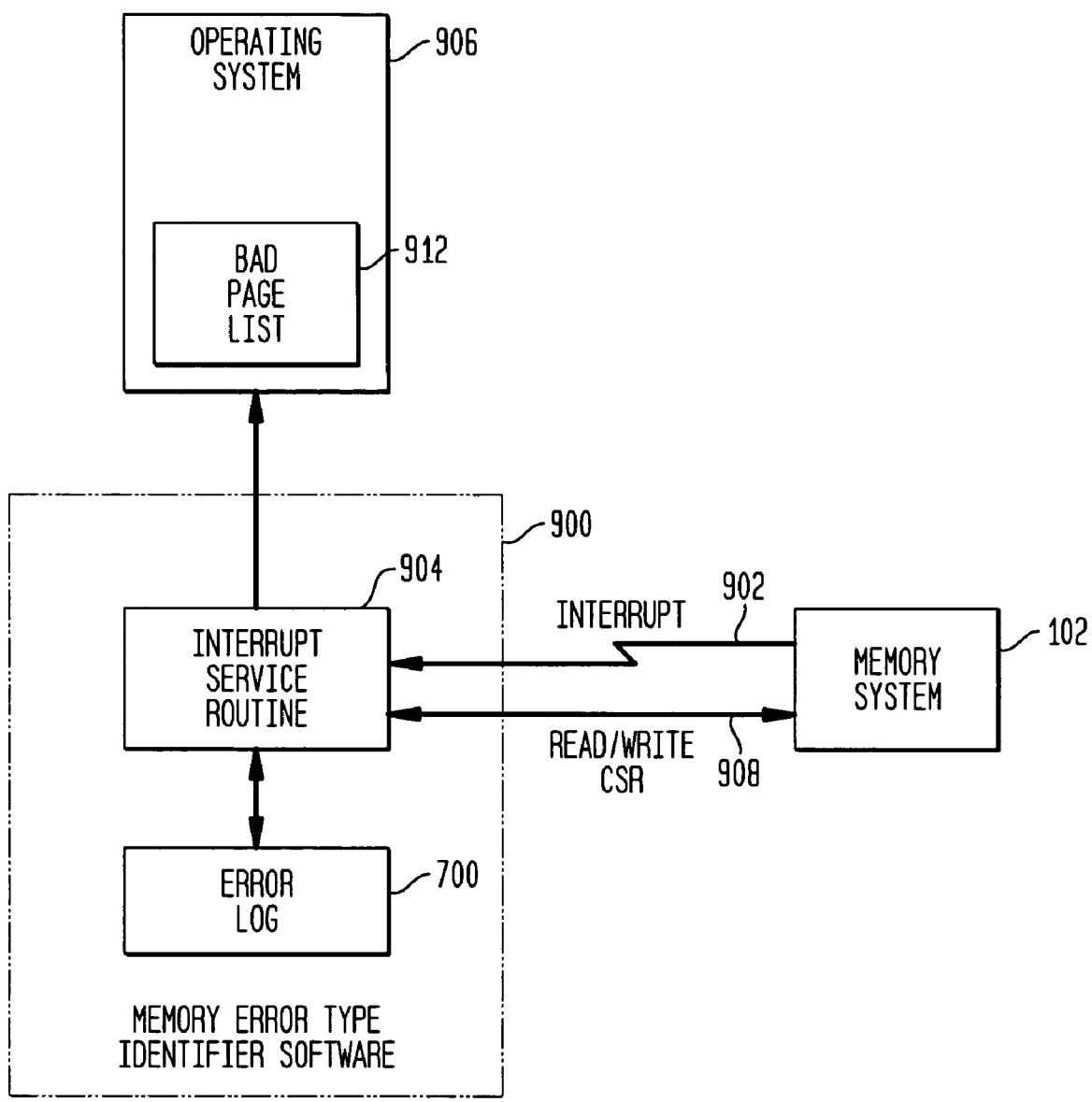
FIG. 9 is a block diagram illustrating interactions between hardware and software of a memory system shown in FIG. 1, according to one embodiment of the present invention.

Having described the hardware implementation of memory module access configurator 204 of this embodiment of the present invention, embodiments of a corresponding software implementation of memory error identifier 202 will now be described with reference to FIG. 9. As noted, when memory system 102 (FIG. 1) detects an uncorrectable error in data from a memory module 104, it generates an interrupt request to central processor 110 via interrupt request line 418 (FIG. 4). FIG. 9 is a block diagram of memory error type identifier software 900 being executed by central processor 110 to handle an interrupt 902. An interrupt service routine 904 is configured to receive control when memory control logic 404 (FIG. 4) generates interrupt 902. An operating system 906 is preferably used to dispatch interrupt 902 to interrupt service routine 904. Interrupt service routine 904 is also configured to control memory system 102 by reading and writing CSR 420, as shown by arrow 908. Error log 700 is preferably used by interrupt service routine 904 to keep track of information regarding errors incurred by memory system 102. Alternatively, error log 700 can be maintained in another memory such as in RAIM memory controller 108. Still other implementations could maintain such error information within the RAIM subsystem.

Figure 10:
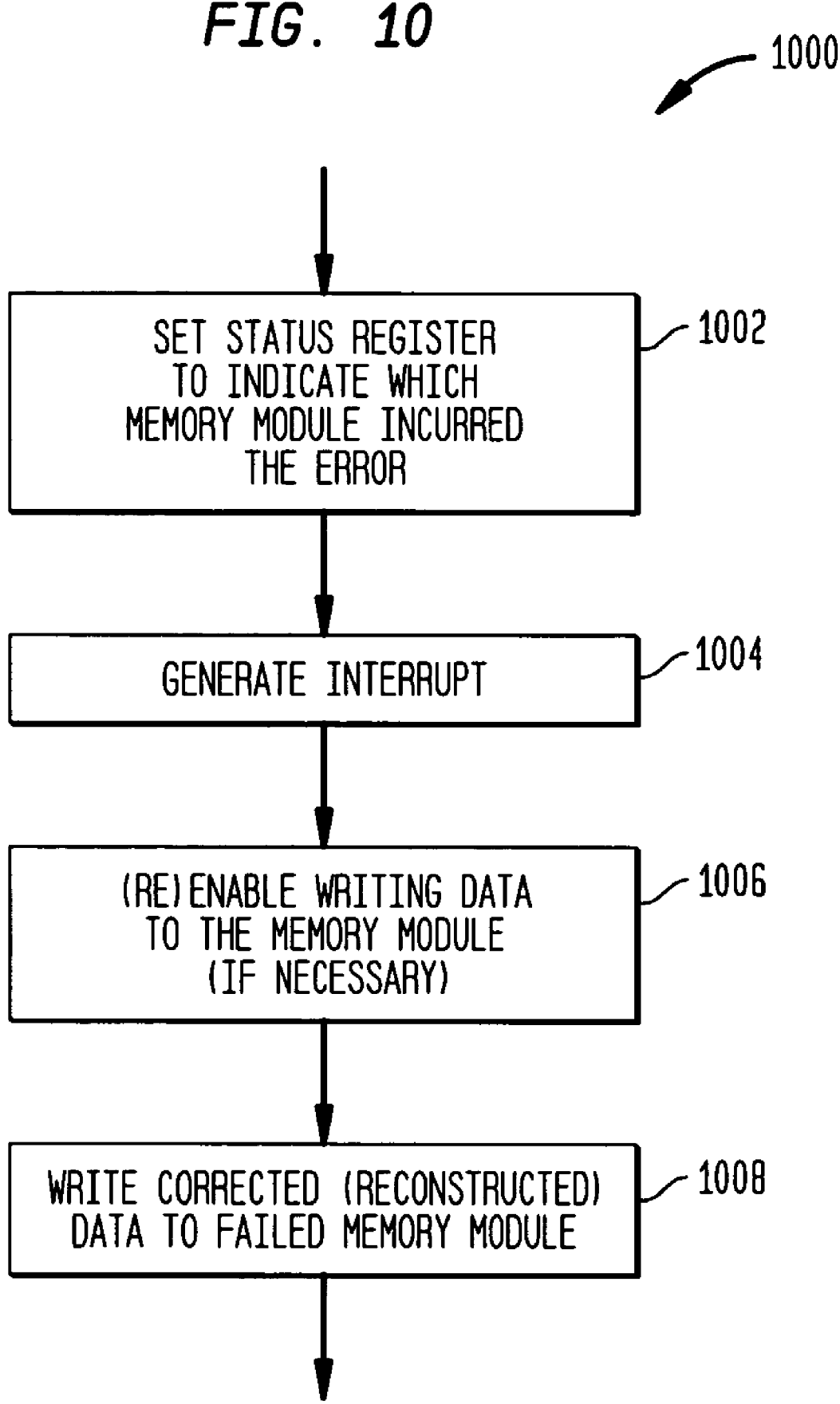
FIG. 10 is a flowchart illustrating operation of memory control logic shown in FIG. 4, according to one embodiment of the present invention.
Figure 11:
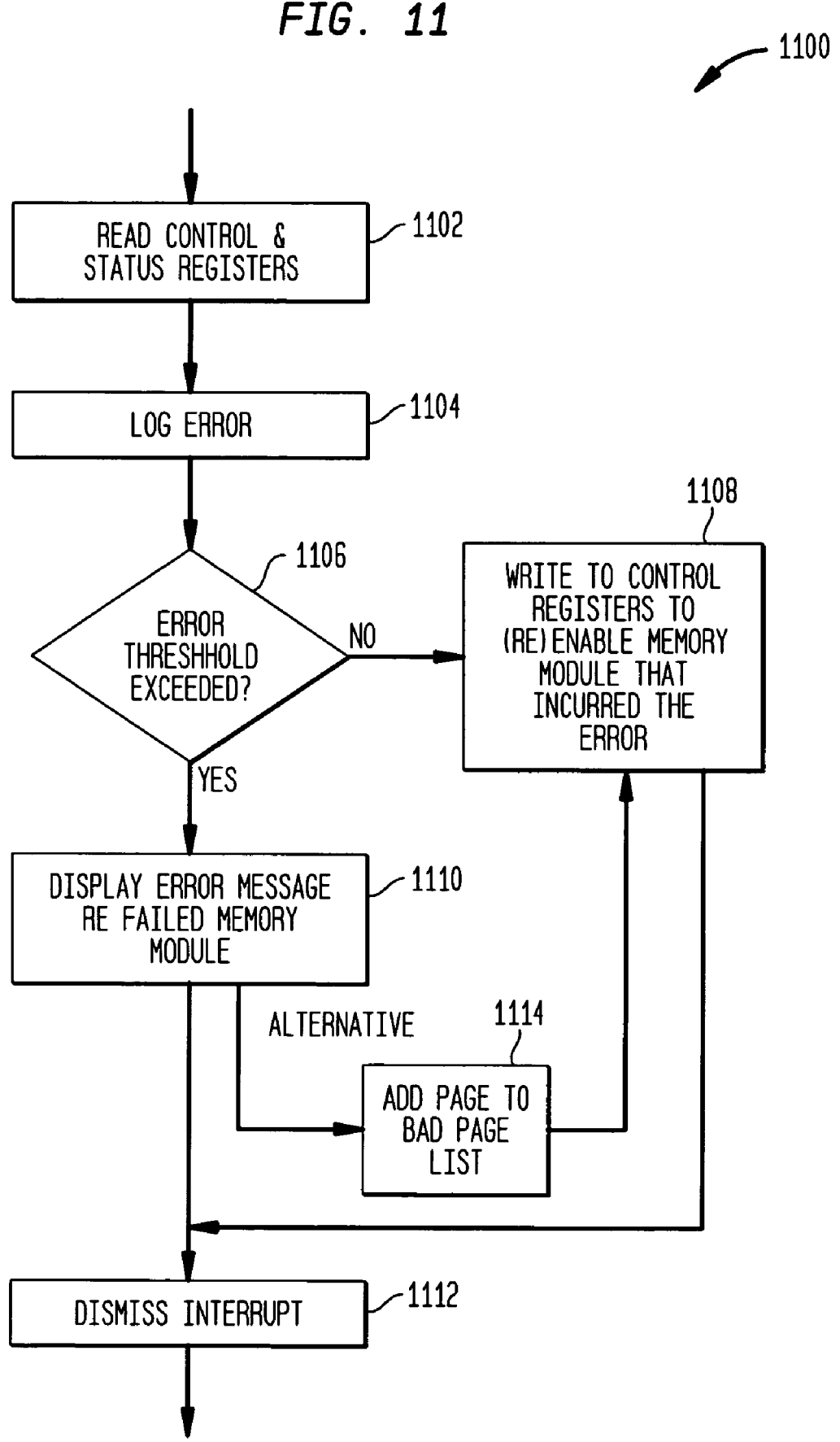
FIG. 11 is a flowchart illustrating operation of the software shown in FIG. 9, according to one embodiment of the present invention.

The operations performed by embodiments of the hardware and software components are described below with reference to FIGS. 10 and 11. As noted above with reference to FIGS. 1 and 4, memory control logic 404 comprises memory modules access configurator 204. FIG. 10 is a flowchart illustrating operations performed by hardware of one embodiment of memory control logic 404 when an uncorrectable data error is detected in a memory module 104. At 1002, memory control logic 404 sets a value in RAIM read map mask 610 (FIG. 6) to indicate which memory module 104 incurred an error. Memory control logic 404 also sets RAIM memory error flag 604 to "1."

At 1004, memory control logic 404 generates an interrupt request to central processor 110 via interrupt request line 418. Operations associated with the processing of such an interrupt by memory error identifier 202 are, as noted, described below with reference to FIG. 11.

As noted, in certain applications, RAIM logic 402 ceases writing to a memory module 104 upon detection of an uncorrectable error. For example, RAIM logic 402 and other portions of memory controller 108 may be implemented with off-the-shelf integrated circuits (ICs). Some such ICs automatically disable write access to a failed memory module 104 after detecting an uncorrectable data error from that module. In such applications, memory control logic 104 re-enables write access to the failed memory module at block 1006. Preferably, such write access is re-enabled prior to the completion of the current memory cycle. This avoids the circumstance in which central processor 110 issues a subsequent write request to memory system 102 prior to the re-enablement of write access to the failed memory module 104.

At 1008, RAIM logic 402 writes the reconstructed data to the failed memory module 104. As previously described, when a memory module 104 incurs an error, RAIM logic 402 reconstructs the data stored in the failed memory module 104, and forwards the requested data over memory bus 116 to service the memory request. At 1008, the reconstructed data is also written to the failed memory module 104 in an operation referred to above as scrubbing. If the error in the failed memory module 104 is soft, scrubbing the data in the failed memory module 104 enables the memory module to subsequently fetch data from the same memory cells without generating additional errors. On the other hand, if the error is hard, the next time the data is fetched, another uncorrectable error will occur.

As noted with respect to FIGS. 9 and 10, when memory control logic 404 (hardware) detects an error in data from one or more of the memory modules 104, the memory control logic generates an interrupt 902 at 1002. FIG. 11 is a flowchart illustrating operations of an embodiment of interrupt service routine 904 which handles interrupt 902. At 1102, CSRs 420 (FIG. 6) are read to ascertain which memory module(s) 104 incurred an error. If necessary, RAIM memory error flag 604 in CSRs 420 is cleared to "0" to indicate to RAIM memory controller 108 that the interrupt is being handled. At 1104, information pertaining to the error is logged, such as in error log 700 (FIG. 7). For the embodiment of error log 700 illustrated in FIGS. 7 and 8, the error count 802 corresponding to the current day is incremented. In the embodiment illustrated in FIG. 8, a periodic process (not shown) shifts the error counts 802 down one bucket 802 at the end of each day.

Returning to FIG. 11, at 1106, memory error identifier software 900 determines whether the error threshold has been exceeded. As noted, the error threshold can be determined based on one or more of a myriad of factors and calculations. If the error threshold has not been exceeded, control passes to 1108 at which memory error identifier software 900 writes to CSRs 420 (FIG. 6) to re-enable read access to the failed memory module 104.

Otherwise, control passes to 1110 at which an error message is displayed identifying the failed memory module 104. Referring back to FIG. 9, interrupt service routine 904 can invoke operating system 906 to display this message. Other well-known techniques, such as illuminating LEDs on the failed memory module 104, can be employed. In either case, at 1112 the interrupt is dismissed.

In an alternative embodiment, portions of a failed memory module are taken out of service, without taking the entire memory module off-line. In this embodiment, operating system 906 (FIG. 9) allocates memory modules 104 in fixed- or variable-size portions called pages, in a well-known manner. Operating system 906 maintains a bad page list 912 that catalogs faulty or questionable memory pages. Once committed to bad page list 912, a memory page is thereafter not allocated for use. Returning to FIG. 11, in this alternative embodiment, if the error threshold is exceeded at 1106, control passes from 1110 to 1114, instead of to 1112. At 1114, the page(s) that incurred the error is/are added to bad page list 910. Read access to the failed memory module 104 is then re-enabled at 1108, and the interrupt is dismissed at 1112. In this alternative embodiment, checking the error threshold at 1106 is optional; control can pass from 1104 directly to 1110 or 1114.

While various embodiments of the present invention have been described herein, it should be understood that they have been presented by way of example only, and not limitation. For example, embodiments of the present invention can be implemented in connection with other redundant memory systems having the same or different storage devices that incur hard and soft errors due to conditions or circumstances other than those noted above. For example, embodiments of the present invention can be implemented in mirrored memory systems. It can also be used with alternatives to RAID 4 redundancy, such as RAID 5 or RAID 6 redundancy or combinations of redundancy technologies. In addition, embodiments of the present invention can be used in systems that permit "hot swapping" of failed memory modules. Furthermore, the invention is not limited to computer applications.

For example, embodiments of the present invention can be used in any system that requires fault-tolerant memory, such as navigation systems and portable defibrillators. As another example, aspects of the present invention that are implemented in software or firmware can be stored in a memory, and control operation of a computer such as a personal computer, workstation, mainframe, control processor, microprocessor or a control processor embedded in another system. The memory can, but need not, be part of an integrated circuit that includes the control processor or microprocessor. The software or firmware can be stored on a removable or fixed computer-readable medium, examples of which include, but are not limited to, CD-ROM, CD-RW, DVD-ROM, DVD-RW, ZIP disk, hard disk or floppy disk. In addition, the software or firmware can be transmitted over a wireless or wired communication link, such as a public or private local or wide area computer network, including the Internet, or a telephone network. Alternatively, aspects of the present invention can be implemented in hardware. For example, the above functionality can be implemented in a single integrated circuit or in a combination of integrated and/or discrete circuits. All or portions of the functionality of the interrupt service routine or memory control logic can be implemented as combinatorial logic, an application-specific integrated circuit (ASIC) or a field-programmable gate array (FPGA).

What is claimed is:

1. A method of configuring access to a failed memory module in a redundant memory system, the method comprising:
   determining a type of the error;
   configuring access to the memory module based on said error type to preserve the redundancy of the memory system; and
   insuring write access to the memory module is not prohibited.

2. The method of claim 1, wherein configuring access comprises:
   enabling access to the failed memory module when the error type is determined to be soft; and
   disabling access to the failed memory module when the error type is determined to be hard.

3. The method of claim 2, wherein configuring access further comprises:
   prior to enabling access, disabling read access to the failed memory module.

4. The method of claim 1, wherein configuring access further comprises:
   logging information regarding said error; and
   determining said error type based at least on said error.

5. The method of claim 1, wherein configuring access further comprises:
   reconstructing data that caused the failed memory module to fail; and
   servicing a memory request with said reconstructed data.

6. The method of claim 4, wherein configuring access further comprises:
   scrubbing the failed memory module with said reconstructed data.

7. The method of claim 1, wherein said determining said error type comprises:
   determining said error type based on said error and prior errors, if any, incurred by the failed memory module.

8. The method of claim 6, wherein the error type is determined based on an error threshold.

9. The method of claim 2, wherein enabling access comprises:
   enabling access to the failed memory module when an error threshold is not exceeded.

10. The method of claim 2, wherein disabling access comprises:
    disabling access to the failed memory module when an error threshold is exceeded.

11. The method of claim 7, wherein said error threshold comprises an error rate.

12. The method of claim 7, wherein said error threshold comprises a quantity of errors.

13. The method of claim 1, wherein configuring access comprises:
    disabling read access to the failed memory module;
    configuring access to the failed memory module based on said error type, comprising:
        continuing to disable read access to the failed memory module when the error type is determined to be hard; and
        enabling read access to the failed memory module when the error type is determined to be soft.

14. A computer system comprising:
    a redundant memory system comprising:
        a plurality of data storage devices; and
        a memory controller that accesses said plurality of data storage devices; and
    an error-type memory controller that configures said access to preserve the redundancy of the memory system and insure write access is not prohibited, such that said memory controller can continue to access a failed one of said plurality of data storage devices that incurred a soft error.

15. The computer system of claim 14, wherein said data storage devices comprise memory modules.

16. The computer system of claim 14, wherein the error-type memory controller comprises:

an error-type identifier that determines a type of error incurred by the failed data storage device, wherein the error-type is one of either a hard error and the soft error; and a memory module access configurator that configures access and redundant memory controller has to the failed data storage device based on the type of memory error.

17. The computer system of claim 16, wherein the error-type identifier determines if the error is soft based on an error threshold.

18. The computer system of claim 17, wherein the error threshold comprises an error rate.

19. The computer system of claim 17, wherein the error threshold comprises a quantity of errors that can occur in a predetermined period of time.

20. A redundant memory system comprising:
   redundant memory logic that accesses one of a plurality of data storage devices; and
   a memory controller that independently controls read and write access to a failed one of said plurality of data storage devices based on whether an error incurred by said failed data storage device is a hard error or a soft error, wherein the memory controller is further configured to preserve the redundancy of the memory system and insure write access is not prohibited.

21. The redundant memory system of claim 20, wherein said plurality of data storage devices comprise a plurality of memory modules.

22. The redundant memory system of claim 20, wherein said memory controller is responsive to a memory error-type identifier that analyzes said error incurred by said failed data storage device, wherein said memory error-type identifier retains information regarding errors incurred in said plurality of data storage devices, and utilizes said retained information to determine whether said error is a hard error or a soft error.

23. The redundant memory system of claim 21, wherein said error-type identifier is implemented in software.

24. The redundant memory system of claim 17, wherein the redundant memory system comprises a RAM (redundant array of independent memory) memory system.

25. The redundant memory system of claim 19, wherein the memory error type identifier makes said determination based on an error threshold.

26. The redundant memory system of claim 21, wherein said error threshold comprises an error rate.

27. The redundant memory system of claim 21, wherein said error threshold comprises a quantity of errors that can occur in each of said plurality of data storage devices over at least one predetermined period of time.

28. A redundant memory system for restoring access to a memory module that incurred an error, comprising:
   means for determining a type of the error;
   means for preserving the redundancy of the memory system and insuring write access is not prohibited; and
   means for restoring access to the memory module when said type of error is determined to be a soft error.

29. A method of configuring access to a failed memory module, comprising:
   discontinuing read access to the failed memory module;
   continuing write access to the failed memory module;
   reconstructing data from the failed memory module;
   scrubbing the failed memory module with the reconstructed data; and
   configuring access to the failed memory module based on an error type.

30. The method of claim 29, comprising logging an error that caused the memory module to fail.

31. The method of claim 29, wherein configuring access comprises discontinuing read access to the failed memory module if the error type is hard.

32. The method of claim 29, wherein configuring access comprises discontinuing write access to the failed memory module if the error type is hard.

33. The method of claim 29, wherein configuring access comprises continuing read access to the failed memory module if the error type is soft.

34. The method of claim 29, comprising determining the error type.

* * * * *

UNITED STATES PATENT AND TRADEMARK OFFICE
CERTIFICATE OF CORRECTION

PATENT NO.       : 7,200,770 B2                                Page 1 of 1
APPLICATION NO.  : 10/750495
DATED            : April 3, 2007
INVENTOR(S)      : David W. Hartwell et al.

It is certified that error appears in the above-identified patent and that said Letters Patent is hereby corrected as shown below:

In column 13, line 3, in Claim 16, delete "and" and insert -- or --, therefor.

In column 13, line 6, in Claim 16, delete "and" and insert -- the --, therefor.

In column 13, line 41, in Claim 24, delete "RAM" and insert -- RAIM --, therefor.

Signed and Sealed this

Ninth Day of September, 2008

JON W. DUDAS
*Director of the United States Patent and Trademark Office*